United States Patent [19]

Holler

[11] 3,892,679

[45] July 1, 1975

[54] CATALYST FOR PREPARATION OF ETHYLENE OXIDE

[75] Inventor: Howard V. Holler, Houston, Tex.

[73] Assignee: Shell Oil Company, Houston, Tex.

[22] Filed: Sept. 24, 1973

[21] Appl. No.: 399,905

[52] U.S. Cl............................ 252/476; 260/348.5 R
[51] Int. Cl.².............................................. B01J 23/48
[58] Field of Search... 252/476; 260/348.5 R, 348.5 F

[56] References Cited
UNITED STATES PATENTS

| | | | |
|---|---|---|---|
| 3,144,416 | 8/1964 | Hosoda et al....................... | 252/476 |
| 3,172,893 | 3/1965 | Ameen............................. | 252/476 X |

Primary Examiner—W. J. Shine

[57] ABSTRACT

Supported silver catalysts active for conversion of ethylene to ethylene oxide are prepared by coating the surface of catalyst support with an overlayer of a silver salt/polyacrylonitrile complex and then heating to about 200°–600°C to pyrolyze the polyacrylonitrile and convert the silver ions into discrete less than 150nm (nanometers) particles of silver. The silver salt/polyacrylonitrile complex overlayer is preferably prepared in situ by polymerization of a silver salt complexed acrylonitrile monomer on the surface of the support. Supported silver catalysts prepared by this process, when activated by treatment with a flowing stream containing a mixture of ethylene and oxygen in combination with an inert gas or by treatment with a flowing stream of air under conditions of time and temperature which facilitate removal of the excess carbon residue but avoid sintering of the catalyst particles, are highly active and selective in the conversion of ethylene to ethylene oxide.

6 Claims, No Drawings

CATALYST FOR PREPARATION OF ETHYLENE OXIDE

BACKGROUND OF THE INVENTION

1. Field of the Invention

This invention relates to a process for preparation of supported silver catalysts, their activation and use in the conversion of ethylene to ethylene oxide.

2. Description of the Prior Art

A variety of methods have been employed to prepare supported silver ethylene oxide catalysts wherein the silver is deposited as discrete, minute metal particles on the surfaces of a non-catalytic support. Among the most attractive of these methods in terms of laying down a silver deposite of ultrafine (less than 100nm) and uniform particle size are those methods involving decomposition of a silver-monomeric or polymeric carboxylic acid salt or complex on the surface of the support to form the free metal particles. For example, U.S. Pat. No. 3,702,259 to Nielsen describes a process whereby a porous inert support is impregnated with a solution containing a complexed silver salt of low molecular weight carboxylic acid, e.g., silver oxalate, complexed and solublized with certain organic amines, and the impregnated (coated) support is then heated to a sufficiently high temperature to decompose the silver salt and deposit the elemental silver in the form of less than 100nm diameter hemispherical particles on the surfaces of the support. A second method which involves metallic silver deposition by decomposition (decarboxylation) if a polymeric carboxylic acid-silver ion complex is disclosed in U.S. Pat. No. 3,758,418 to Leonard et al. issued on Sept. 11, 1973 (common assignee). with that method, discrete silver particles having a particle size less than 100nm are uniformly deposited on the support surface by a multi-step process which comprises coating a support with a polymerized ethylenically unsaturated acid, such as polyacrylic acid, contacting the coated support with silver ions present as silver salts or complexes in non-aqueous media and then heating to a temperature sufficient to dicarboxylate the polymerized acid and convert the silver ions into the discrete metallic silver particles.

Other possible methods for depositing metallic silver in the form of fine particles on a support surface are described in U.S. Pat. No. 3,043,854 to Endler wherein the silver deposit is laid down on the support surface by adding a slurry of fine particles of fine particles of silver carbonate to the support and thermally decomposing the carbonate salt and in U.S. Pat. No. 3,575,888 to Long wherein the support is impregnated with an aqueous solution of silver nitrate, dried and the silver reduced to metallic silver particles with hydrogen or hydrazine.

The ability of the nitrile functional group to form a variety of metal complexes is well known. High molecular weight species bearing a multiplicity of such ligand groups, such as polyacrylonitrile, also complex metals, but these complexes have not been extensively studied. A few polyacrylonitrile complexes containing small amounts of metals have been prepared, pyrolyzed and the products partially characterized according to literature reports. Thus a polyacrylonitrile complex containing 0.14%w Ni was pyrolyzed and the electrical conductance properties of the metal containing solid carbonaceous material were evalutated by L. A. Lyatifova et al. in *Doklady Akad Nau AZERB. SSR* 20 31–33 (1946) and by M. A. Magrupov et al in *Vysokomol Soedin* 12 664(1970). Also, a similar study on pyrolyzed polyacrylonitrile containing copper, present as cupric chloride prior to pyrolysis, has been reported by A. V. Topchiev et al in *Journal of Polymer Science A.* 1, 591(1963). Lastly, at least one study is reported wherein the catalytic properties of a pyrolyzed polyacrylonitrile composition containing small quantities of copper (0.01% Cu before pyrolysis) was examined in several reactions none of which were oxidation reactions. In that study by E. S. Dokukina et al reported in *Doklady Akad Nauk SSR* 137 893(1961) the presence of the copper was said to have a negligible influence on the reactions attempted.

However, while the pyrolysis of metal containing polyacrylonitrile compositions has been studied in the limited sense described above, no disclosure is known of any attempt to prepare a finely divided metal or metal oxide catalyst on the surface of an inert support having practical utility such as those supported silver ethylene oxide catalysts described above, via deposition of a metal (silver) containing polyacrylonitrile on the surface of the support followed by pyrolysis of the polymer. British Pat. No. 1,305,596 discloses Group VIII metal catalysts supported on a pyrolyzed polyacrylonitrile polymer carrier which apparently have practical utility as hydrogenation or dehydrogenation catalysts in other processes. However, in the technique taught for catalyst preparation in this patent the polyacrylonitrile carrier particles are pyrolyzed prior to addition of the Group VIII metal via treatment with an aqueous solution of a Group VIII metal salt or acid. Thus, it appears that the function of polyacrylonitrile in the British patent is merely as a substitute for other conventional carbonaceous carriers such as charcoal rather than being a vehicle for deposition of elemental metal particles on a support surface via application of a metal ion-polyacrylonitrile complex to a support surface followed by decomposition of the complexes.

SUMMARY OF THE INVENTION

It has now been found that supported silver catalysts active in the conversion of ethylene to ethylene oxide are prepared by the process which comprises (a) coating the surfaces of a catalyst support with an overlayer of polyacrylonitrile complexed with a silver salt and (b) heating the coated support at a temperature of from about 200° to about 600°C for a period of time sufficient to pyrolyze the polyacrylonitrile and convert the silver ions of the complexed silver salt into discrete particles of silver. In a preferred embodiment of the silver catalyst preparation according to the invention, the overlayer of polyacrylonitrile complexed with a silver salt, as described in step (a), is prepared in situ by polymerization of a silver salt complexed acrylonitrile monomer on the surface of the support. Silver catalysts prepared by the above described process, which contain metallic silver in the form of a uniform dispersion of particles having diameters less than about 150nm on the support surface, exhibit enhanced activity and selectivity in the conversion of ethylene to ethylene oxide when activated by treatment with a flowing stream of a gaseous mixture of ethylene and oxygen in combination with an inert gas or a flowing stream of air at elevated temperature under treatment conditions which facilitate removal of the excess carbon residue but avoid sintering of the catalyst particles. Accordingly, another aspect of the invention is the partial oxidation of ethylene to ethylene oxide wherein ethylene and an oxygen containing gas are contacted in the vapor phase at elevated temperature in the presence of a supported silver catalyst prepared and activated in the manner described above.

DESCRIPTION OF THE PREFERRED EMBODIMENTS

Catalyst Preparation

In the first step of the catalyst preparation process of this invention, a catalyst support is coated with an overlayer of polyacrylonitrile complexed with a silver salt. This overlayer of the polyacrylonitrile-silver salt complex can be conveniently laid down on the support surface by a variety of methods including those wherein the silver salt complex is formed on a support surface precoated with uncomplexed polyacrylonitrile and those wherein the polyacrylonitrile silver salt complex is applied directly to the support surface either as the preformed polymer salt complex or as the monomer salt complex which is then polymerized onto the support surface.

In the procedures wherein the silver salt complex is formed after precoating the support surface with polyacrylonitrile, the polyacrylonitrile precoat may be suitably applied to the support as a monomer and then polymerized on the support surface or it may be applied to the surface in an already polymerized form. If the uncomplexed acrylonitrile is applied in monomeric form, it may be polymerized in accord with well-known methods of polymerization such as the free radical polymerization technique. In this technique the acrylonitrile monomer is polymerized while in contact with the support, either in the presence or absence of a diluent, by the addition of a small quantity of a free radical polymerization initiator at a temperature which typically ranges from 0° to 200°C. Conventional free radical initiators which are suitable as polymerization catalysts in this reaction include benzoyl peroxide and other peroxide catalysts, azobisiosobutyronitrile, perbenzoic acid and the like. If the uncomplexed polyacrylonitrile is applied to the support, a polymerization substantially as described above in the absence of the support may be carried out and the polyacrylonitrile so formed may be laid down on the support by any suitable method, for example by dipping the support in a solution of polyacrylonitrile in an inert solvent or by spraying the support with the solution. Suitable inert diluents or solvents for both the polymerization of the uncomplexed acrylonitrile monomer, in the presence or absence of the support, and the application of the uncomplexed polyacrylonitrile polymer to the support surface typically include those polar organic compounds in which polyacrylonitrile is substantially soluble. Examples of such solvents or diluents are gamma-butyrolactone, ethylene carbonate, dimethylformamide and dimethylsulfoxide. When solvents of this variety are employed it is desirable to remove the excess solvnent, after application of the solution to the support, by means such as vacuum drying, which avoid extraction of the polyacrylonitrile coating off the support. Alternatively, the polyacrylonitrile can be precipitated onto the support surface from the polymer solution by the addition of non-solvents such as methanol or toluene to mixtures of the support and the polymer solution. The polyacrylonitrile overlayer can also be applied by polymerization of the acrylonitrile in the presence of the support; non polar organic solvents such as benzene, toulene, cyclohexane and n-hexane exhibiting solvency for the monomer can be employed as polymerization solvents since the polymer will precipitate on the support as it is formed. When these solvents are employed it is again desirable to remove the excess solvent by filtration and/or vacuum drying.

The complexing of the silver salt with the polyacrylonitrile, precoated on the support surface according to either of the above described techniques, is carried out by contacting the polyacrylonitrile coated support with a silver I salt or complex in solvent. Suitable solvents for this step in which the silver salt complex of the polymer is formed are those polar organic solvents which will not appreciably extract the polymer coating off the support surface, though some slight solvency for the polymer is desired to soften and plasiticize the polymer surface and allow for diffusion of the metal ions into the polymer layer. Examples of solvents having acceptable solvency characteristics in this application are acetone, methanol, acetonitrile, ethyleneglcyol and mixtures thereof. In special cases aqueous mixtures are useful. Since this complex forming step is carried out in a medium of the type described, the silver I ion must be added in the form of salts or complexes which are at least partially soluble in the media. Examples of such salts and complexes are salts of carboxylic acids such as formate, trifluoroacetate, butrate, 2-ethyl hexanoate, lactate and citrate, complexes such as those derived from pyridine and silver acetate or 1,5-cyclooctadiene and silver nitrate, and the soluble salts of mineral acids such as silver nitrate. Of this class silver I compounds silver nitrate and its complexes are preferred. To form the silver salt complex overlayer of this invention the polyacrylonitrile coated support is contacted with the silver salt solution, preferably containing from about 0.03 to about 3 equivalents of silver ion per liter, at temperatures ranging from ambient to 125°C for a period long enough to permit the silver ions to complex with the polyacrylonitrile. After passage of sufficient contacting time to allow complex formation on a substantial portion of the accesible ligand sites, time periods of 0.5 to 24 hrs. generally being sufficient, the coated support containing the silver salt-polyacrylonitrile complex overlayer is recovered from the excess silver salt solution by conventional methods such as sieving, decanting and the like. Alternatively, the silver-depleted solvent can be removed by vacuum distillation. This coated product as recovered from the excess silver salt typically contains only a minor amount or residual solvent and can suitably be employed directly in the thermal pyrolysis procedure discussed below to afford the particulate silver catalysts of the invention. However, due to the hazards encountered when flammable organic solvents are exposed to high temperatures it is generally preferred to remove the residual solvent by conventional means such as vacuum drying at ambient and/or moderately elevated temperatures prior to pyrolysis.

As indicated above, the polyacrylonitrile-silver salt complex can also be applied to the support surface as the preformed polymer-salt complex or as the monomer-salt complex which is then polymerized onto the support surface. In procedure where the preformed polymer-salt complex is employed as the coating agent, the polymer-salt complex may be suitably prepared separate from the support by polymerizing the acrylonitrile monomer in solution according to the procedure described above, and adding the appropriate amount of silver salt to the polymer solution. It is most desirable to employ the very best solvents for polyacrylonitrile, such as gamma-butyrolactone, dimethylformamide, dimethylacetamide, or dimethylsulfoxide, in this procedure as certain marginal solvents such as ethylene carbonate and hexafluoroisopropanol precipitate the polyacrylonitrile-silver salt complex when the solution of silver nitrate or silver trifluoroacetate is added. This preformed polymer salt complex in solution may then be applied to the support surface by conventional means such as spraying or dipping or merely by making up a slurry of support particles with a polymer salt complex solution of desired dilution in the polymerization solvent and removing the solvent by vacuum drying techniques. In any case, where solution coating is involved it is preferred to remove the residual solvent prior to charging the coated support particles to the thermal pyrolysis phase of the process discussed below.

The preferred procedure for coating the support surface with an overlayer of polyarylonitrile-silver salt complex according to this invention involves the technique which is lastly mentioned above-i.e., the procedure wherein the polymer salt-complex is applied directly onto the support surface by polymerization of the monomer salt complex in the presence of the support. This procedure is preferred because it allows advantage to be taken of the high solvency and complex forming ability which acrylonitrile exhibits for silver salts and the ease with which acrylonitrile solutions of silver salts polymerize. In this procedure acrylonitrile and the silver salt are combined directly at ambient or moderately elevated temperatures in the desired molar proportions to form a solution containing the complexed silver salt. The silver salts employed in this procedure are suitably selected from the class of soluble salts described above, with silver nitrate being preferred. After addition of the silver salt to the acrylonitrile this solution can be applied almost immediately to the surface of the support and polymerized. To insure a polymerized layer of proper thickness on the support, it is advantageous to combine the support with the acrylonitrile solution, using conventional means such as pouring the liquid solution into a reaction vessel containing the support, in proportions such that the solution thoroughly wets the support surface without any appreciably excess liquid phase. Once the support is wet the acrylonitrile-silver salt complex may be polymerized onto the support surface, in the presence or absence of a conventional free radical polymerization initiator by heating the reaction mixture at temperatures ranging from 50° to 150°C for a time period of from 0.5 up to 12 hrs. Often it is convenient to slurry the monomer-complex coated support with a non-polar organic solvent in which the monomeric silver salt complex and the polymerized product are essentially non-soluble to effect efficient heat transfer at the temperature selected for polymerization. Suitable non-polar organic heat transfer solvents for the polymerization reaction include straight chain, branched-chain an cycic aliphatic hydrocarbons such as n-pentane, n-hexane, 3-ethylhexane, octane, cyclopentane and cyclohexane and aromatic hydrocarbons such as benzene, toluene and xylene. Although the polymerization can be carried out to yield a polyacrylonitrile of acceptable molecular weight without the aid of a conventional initiator, it is preferable to carry out the polymerization reaction in the presence of a free radical initiator such as those conventional initiators described above with azobisisobutyronitrile and benzoyl peroxide being most preferred. It is efficacious to dissolve the free radical initiator in the acrylonitrile-silver salt sodium prior to the wetting of the support surface with this solution. Upon completion of the polymerization reaction period, the coated support is suitably separated from the polymerization solvent by conventional means such as seiving or decanting or the like. This coated product may be charged directly to the thermal pyrolysis step for conversion to the particulate silver catalysts of the invention, however for reasons of safety discussed above, it is preferable to remove any residual solvent by means such as vacuum and/or heat prior to pyrolysis.

With any of the above described procedures for application of the polyacrylonitrile-silver salt complex to the support surface, polyacrylonitrile compositions having an average molecular weight of from about $10^3$ up to above $10^6$ can be employed. For those procedures in which the polyacrylonitrile is formed prior to application to the support surface, polymeric compositions having an average molecular weight of from about $10^3$ to $10^5$ are preferred because of the lower viscosities of the polymer solutions which must be handled. In those procedures including the preferred procedure, wherein the acrylonitrile or acrylonitrile-silver salt complex is polymerized onto the support surface, best results are obtained when the polymerization is carried out to obtain a polyacrylonitrile having an average molecular weight of from about $10^3$ to above $10^6$, this higher molecular weight limit not being critical.

The quantities of polyacrylonitrile and silver salt applied to the support surface may vary within wide limits and depend primarily on the proportion of particulate silver desired in the catalyst products of this invention. While the coordination stoichiometry in the polyacrylonitrile-silver salt complex has not been established with certainty for all possible silver salt complexes, it appears that for salts having monovalent anions such as silver nitrate, stable complexes can be formed having up to at least 34% by weight silver based on the total complex weight. The lower limit on the amount of silver salt in the polyacrylonitrile-silver salt complex coating of this invention is, for all practical purposes, dependent on the quantity of silver desired in the final catalyst product with amounts of silver salt, expressed as percent by weight silver in the polymer complex, as low as about 1% being suitable. Preferably, the quantity of silver salt present in the polyacrylonitrile complex overlayer of this invention ranges from about 5 to 34% by weight silver based on total complex weight. The quantity of polyacrylonitrile which may be readily applied to the support surface and pyrolyzed according to the procedure described below to yield the catalyst products of the invention is not critically limited and conveniently ranges from about 5% by weight to about 45% by weight based on the total supported catalyst weight. When a quantity of silver salt within the preferred range given above is utilized in the polymer complex of the invention, the quantity of silver applied to the support surface preferably ranges between about 3% by weight and about 15% by weight, based on total supported catalyst weight.

The supported catalyst products of this invention containing particulate deposits of metallic silver are prepared by heating the polyacrylonitrile-silver salt complex coated supports to a temperature in the range of from about 200° to about 600°C. At temperatures in this range other studies have suggested that polyacrylonitrile pyrolyzes with concomitant cyclization and loss of hydrogen and some ammonia and hydrogen cyanide to yield a polypyridine-like structure. While this mechanism could account for the reduction of the coordinated silver salts in the polyacrylonitrile matrix which has been found to occur in the instant process, the weight loss on pyrolysis of the complexed polyacrylonitrile considerably exceeds the 4% required for the idealized dehydrocyclization of polyacrylonitrile to the polypyridine structure. It has not yet been possible to assign with certainty any definite mechanism to the pyrolysis which occurs in the instant process, nor moreover, to ascertain the exact structure of the pyrolyzed char which remains. The pyrolysis according to the instant invention can be carried out in an oxygen-containing environment for example, in air; in an inert environment such as in nitrogen or argon; or in a vacuum; or in a reducing atmosphere such as hydrogen. Due to the tendency of certain polyacrylonitrile-silver salt complexes especially silver nitrate complexes, to spontaneously ignite at the pyrolysis temperatures, it is preferred to carry out the pyrolysis in stages in an inert atmosphere such as nitrogen or in a vacuum.

As indicated above the pyrolysis is suitably carried out at a temperature of from about 200° to about 600°C. At temperatures in this range substantial pyrolysis of the polyacrylonitrile matrix with concomitant conversion of all or substantially all of the complexed silver ions into discrete ultrafine particles of metallic silver is obtained through employment of pyrolysis times ranging from about 2 to 12 hours. From a procedural standpoint, the pyrolysis may be suitably carried out by slowly increasing the pyrolysis temperature with increasing residence time until the maximum pyrolysis temperature is reached—i.e., 600°C or, preferably about 500°C—or until substantial pyrolysis is obtained. Preferably, the pyrolysis is carried out in step wise fashion wherein the pyrolysis is initiated at temperatures of about 200°C and the pyrolysis temperature is incrementally increased with holding periods at each intermediate temperature level until a maximum temperature of about 450°C is attained. In this preferred pyrolysis procedure, the intermediate temperature levels may suitably differ by 50° to 100°C with the residual time at each temperature level ranging from about 0.5 to 5 hours.

The products of the pyrolysis carried out according to this invention are supported silver materials which are catalytically active in the conversion of ethylene to ethylene oxide. These supported catalysts suitably contain from 2 to 20% by weight of metallic silver deposited evenly on the interior (pore) and exterior surfaces of the support. Preferably they contain 3 to 15% by weight of silver metal on the same basis. The metallic silver is present as tiny individual particles generally having diameters less than 150nm with many particles having diameters less than 20nm. Scanning electron micrographs of typical supported silver catalysts prepared by the process of the invention show an average silver particle size of about 100nm whereas other analytical techniques such as X-ray diffraction indicate many of the silver particles to have particle diameters of less than 20nm. Generally a minor amount of nitrogeneous and carbonaceous residue remains on the catalyst support when the pyrolysis is carried out accordingly to this invention. Typically, this residue from the pyrolyzed polyacrylonitrile ranges from about 2 to 30% by weight of total catalyst weight.

The support employed in these catalysts in its broadest aspects is selected from the large number of conventional porous refractory catalyst carriers or support materials which are essentially inert in the presence of the ethylene oxidation feeds, products and reaction conditions. Such conventional materials may be of natural or synthetic origin and preferably are of a macroporous structure, that is, a structure having a surface area below about 10 $m^2/g$ and preferably below about 5 $m^2/g$. These support materials typically have an "apparent porosity" of greater than 20%. Very suitable supports comprise those of siliceous and/or aluminous composition. Specific examples of suitable supports are the aluminum oxides (including the materials sold under the trade name "Alundum"), charcoal, pumice, magnesia, zirconia, kieselguhr, fuller's earth, silicon carbide, porous agglomerates comprising silicon and/or silicon carbide, magnesia, selected clays, artificial and natural zeolites, metal oxide gel-type materials comprising oxides of heavy metals such as molybdenum, tungsten and the like, ceramics, etc. Refractory supports particularly useful in the preparation of catalysts in accordance with this invention comprise the aluminous materials, in particular those containing alpha alumina. In the case of alpha alumina-containing supports, preference is given to those having a specific surface area as measured by the B.E.T. method of from about 0.03 to about 2.0 $m^2/g$ and an apparent porosity as measured by conventional mercury or water absorption techniques of from about 25 to about 50% by volume. The B.E.T method for determining specific surface area is described in detail in Brunauer, S., Emmet, P.H., and Teller, E., *J. Am. Chem. Soc.*, 60 309–16 (1938). The physical shape and size of the support is wholly conventional and includes small particles of regular or irregular shape suitable for use in fluidized bed applications or larger chunks, pellets and the like appropriate for use in fixed bed catalytic process. Preferably the support particles are in the form of tablets, rings, pellets or the like of a size suitable for use in fixed bed operations.

Catalyst Activation

While the catalyst products of the polyacrylonitrile pyrolysis procedure of this invention exhibit catalytic activity for, and may be used directly in, the partial oxidation of ethylene to ethylene oxide, the activity and selectivity of these catalysts can be considerably enhanced by activation in an atmosphere and under conditions which substantially remove the residual carbon but avoid or minimize sintering of the catalyst particles. While this catalyst activation step is not limited to any particular method or methods which accomplish the desired result—i.e., substantial burn off or removal of the residual carbon without concomitant sintering of catalyst particles—at least two different catalyst activation or residual carbon removal procedures appear to be particularly applicable to the catalyst products of this invention. The first of these procedures involves treatment of the catalyst particles with a flowing gaseous stream comprising a mixture of ethylene and oxygen, preferably in combination with an inert gas such as nitrogen, at temperatures in the range of about 190° to about 230°C for a time period of not less than about 40 hours. The amounts of ethylene and oxygen employed in this procedure and suitably 20–40% molar (m) and 5–10%m, respectively, of the total composition of the treatment stream with the inert gas, preferably nitrogen, comprising the balance of the stream. In carrying out this activation procedure, best results are obtained when a treatment stream containing about 30% m ethylene and about 8% m oxygen (balance nitrogen) is employed in a procedure wherein the treatment stream is slowly heated from about 190°, initial, up to about 230°C, final, over a time period of not less than about 50 hours. This preferred activation procedure not only gives excellent results, but additionally, is quite convenient in that the proportions of ethylene and oxygen employed correspond rather closely to the reactant concentrations employed in a conventional feed stream to an oxygen based ethylene oxide production process. Accordingly, once the catalyst has been activated by this preferred procedure, which is quite suitably carried out on catalyst loaded in the ethylene oxide reaction zone, the temperature and other reaction conditions can be easily adjusted to the ethylene oxide manufacturing conditions thereby facilitating direct conversion from catalyst activation to ethylene oxide production with the activated catalyst.

The second method of catalyst activation involves treatment of the pyrolyzed catalyst particles with a flowing stream of air at temperatures in the range of about 150° to 210°C. With this procedure temperatures above about 210°C are to be avoided since substantial sintering of the catalyst particles occurs at these higher temperatures. In fact, at least a minor amount of catalyst sintering has been found to occur at temperatures in the range which the activation procedure is operative. Accordingly, it is preferred to carry out the catalyst activation in this procedure at the lower end of the operative range, most preferably temperatures of about 160°C, in order to achieve maximum catalyst activity with a minimum amount of sintering of catalyst particles. The treatment times employed with this air activation procedure are substantially similar to those employed in the ethylene/oxygen activation procedure with times of not less than about 20 hours being suitable.

Ethylene Oxide Production

The silver catalysts, prepared and activated in the manner described have been shown to be particularly selective catalysts in the direct oxidation of ethylene with molecular oxygen to ethylene oxide. The conditions for carrying out such an oxidation reaction in the presence of the silver catalysts of the present invention broadly comprise those described in the prior art. This applies, for example, to suitable temperatures, pressures, residence times, diluent materials, such as nitrogen, carbon dioxide, steam, argon, methane or other saturated hydrocarbons, presence or absence of moderating agents to control the catalytic action, for example, 1,2-dichloroethane, vinyl chloride or chlorinated polyphenyl compounds, the desirability of employing recycle operations or applying successive conversion in different reactors to increase the yields of ethylene oxide, and any other special conditions which may be selected in processes for preparing ethylene oxide. Pressures in the range of from about atmospheric to about 35 atm are generally employed. Higher pressures may, however, be employed within the scope of the invention. Molecular oxygen employed as reactant is obtained from conventional sources. The suitable oxygen charge may consist essentially of relatively pure oxygen. A concentrated oxygen stream comprising oxygen in major amount with lesser amounts of one or more diluents such as nitrogen, argon, etc., or another oxygen-containing stream such as air. It is therefore evident that the use of the present novel silver catalysts in ethylene oxidation reactions is in no way limited to the use of specific conditions among those which are known to be effective.

In a preferred application of the silver catalysts of the invention ethylene oxide is produced when an oxygen-containing gas separated from air and containing not less than 95% oxygen is contacted with ethylene in the presence of the present catalysts at a temperature in the range of from 210°C and preferably 225°C to 270°C.

ILLUSTRATIVE EMBODIMENT I

A solution of 3.20 g acrylonitrile, 2.05 g silver nitrate and 0.03 g. azobisisobutyronitrile was poured onto 10 g of 30–40 mesh commercial aluminum oxide (Norton Company's Alundum grade LA-5556), having a surface area of about 0.2 $m^2/g$ in a reaction vessel. This solution just wet the aluminum oxide particles without any appreciable liquid phase present. Thirty milliliters of n-hexane was then added to the reaction vessel to provide the desired heat transfer and the mixture was heated to reflux under nitrogen atmosphere for 1.5 hours. Observation of the reaction indicated that the acrylonitrile/silver nitrate complex polymerized during the initial heating period. Upon competion of the reaction period the solids were filtered off and vacuum dried for 1 hour at 60°C to yield 13.5 g of a mustard yellow granular solid. Twelve grams of this yellow solid were pyrolyzed under a nitrogen atmosphere in a tube furnace as follows: 2 hrs. at 200°C, 1 hr. at 250°C, 1 hr. at 300°C and 2 hrs. at 400°C. The product of this pyrolysis was a grey solid containing 12.0% by weight particulate silver (in the metallic form). X-ray diffraction indicated that many of the silver particles had crystallite sizes in the range of 10nm.

This grey solid was tested for catalytic activity in the partial oxidation of ethylene to ethylene oxide by passing a mixture of air and ethylene over the catalyst packed in a 0.20 in diameter by 5 inch long reaction tube in the presence of a chlorine-containing moderator. The reaction conditions were approximately as follows: pressure 15 atm. abs.; space velocity hours $^{-1}$ = 30; 30% m ethylene in the charge; ethylene/oxygen ratio = 3.75; moderator concentration equivalent to 10 to 15 ppm chlorine. Under these conditions at a reaction temperature of 205°C and an oxygen conversion of 18%, a selectivity of ethylene to ethylene oxide of approximately 65% was obtained.

ILLUSTRATIVE EMBODIMENT II

Using the polymerization procedure given in Illustrative Embodiment I, thirty grams of 20–30 mesh aluminum oxide (Norton Company's LA-5556) was again coated with a solution of acrylonitrile (10.60g) containing silver nitrate (3.40g) and Azobisisobutyronitrile (0.10G). This coated product was then subject to pyrolysis in a vaccum at the following conditions: 1 hr. at 210°C; 2 hrs. at 250°C; 1 hr. at 300°C; 2 hrs. at 350°C and 1.5 hrs. at 400°C. The pressures employed during the pyrolysis period ranged between about 0.5 and 1 mm Hg with the final pressure being 0.1 mm Hg. The product of the pyrolysis was a grey solid containing 7% by weight of metallic silver particles. The product also contained about 2% by weight carbon.

This grey solid was also tested for catalytic activity in the conversion of ethylene to ethylene oxide under reaction conditions similar to those decribed in Illustrative Embodiment I. In this test the reaction feedstock composition was about 55%w ethylene, 10%w oxygen and 35%w nitrogen and the catalyst was conditioned prior to use by passing 0.05 mole of air per hour over the catalyst at about 15 atm. abs. psig and 210°C for 15 to 24 hours. No halogenated moderator was employed. At a reaction temperature of 240°C and an oxygen conversion of 36% the catalyst gave as conversion of ethylene to ethylene oxide of about 76%.

ILLUSTRATIVE EMBODIMENT III

A catalyst prepared according to the procedure described in Illustrative Embodiment II was activated by passing a gaseous stream containing a mixture of 30% m ethylene, 8% m oxygen, and 62% m nitrogen over the catalyst particles in an isothermal tubular reactor at a pressure of about 15 atm. abs. while the temperature was slowly increased over an activation period of about 50 hours from about 190° to 230°C. During this period the catalyst weight declined by a factor of about 10% indicating removal of the carbonaceous residue. After activation the catalyst was tested for catalytic activity in the conversion of ethylene to ethylene oxide using a procedure similar to that described in Illustrative Embodiment I. Here at reaction temperatures of 225° and 230°C and oxygen conversions of 40 and 52%, respectively, selectivities of 78.3 and 76.5 (ethylene to ethylene oxide) were obtained.

ILLUSTRATIVE EMBODIMENT IV

In a procedure similar to that utilized in Illustrative Embodiment III. Catalyst particles prepared according to Illustrative Embodiment II were activated by treatment with air in a nonisothermal tubular reactor. These catalysts were then tested for activity in the conversion of ethylene oxide. The table below gives the activation conditions and the results of the evaluations for catalytic activity, $T_{40}$ being the temperature at which 40% oxygen conversion was obtained and $S_{40}$ being the selectivity of ethylene to ethylene oxide at the 40% oxygen conversion level.

| Temperature of Air Treatment, °C | $T_{40}$ °C | $S_{40}$ %m |
|---|---|---|
| 300 | 250 | 71 |
| 210 | 232 | 75.7 |
| 160 | 228 | 76.7 |
| 160 | 238 | 77.1 |

What is claimed is:

1. A process of preparing a supported silver catalyst active in the conversion of ethylene to ethylene ethylene oxide containing from about 2 to 20% by weight metallic silver deposited evenly on the surface of a catalyst support as discrete particles having an average diameter of less than about 150nm which comprises:
    a. coating the surfaces of a catalyst support with an overlayer of polyacrylonitrile complexed with silver salt and
    b. heating the coated support at a temperature of from about 200° to about 600°C for a period of time sufficient to pyrolyze the polyacrylonitrile and convert the silver ions of the complexed silver salt into discrete particles of silver.

2. The process in accordance with claim 1, wherein the catalyst product of the polyacrylonitrile pyrolysis step (b) is activated by removal or burn off of the excess carbonaceous residue under conditions which avoid or minimize sintering of the catalyst particles.

3. The process in accordance with claim 2, wherein the catalyst activation is accomplished by treatment with a flowing stream of a gaseous mixture of ethylene and oxygen in combination with an inert gas or a flowing stream of air at elevated temperatures.

4. The process in accordance with claim 3, wherein the catalyst activation is accomplished by treatment with a flowing stream of a gaseous mixture of ethylene and oxygen in combination with an inert gas at treatment temperatures in the range of about 190° to about 230°C for a time period of not less than 40 hours.

5. The process in accordance with claim 4, wherein the concentrations of ethylene and oxygen are 20–40 molar and 5–10 molar, respectively, in the treatment stream with the balance of the stream being nitrogen.

6. The process in accordance with claim 1, wherein the overlayer of polyacrylonitrile complexed with a silver salt is deposited on the support surface by polymerization of acrylonitrile complexed with a silver salt in the presence of the uncoated support.

* * * * *